United States Patent
Zhu et al.

(10) Patent No.: US 10,957,319 B2
(45) Date of Patent: Mar. 23, 2021

(54) SPEECH PROCESSING METHOD, DEVICE AND COMPUTER READABLE STORAGE MEDIUM

(71) Applicant: BAIDU ONLINE NETWORK TECHNOLOGY (BEIJING) CO., LTD., Beijing (CN)

(72) Inventors: Kaihua Zhu, Beijing (CN); Yuan Tian, Beijing (CN); Xuejian Zheng, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 140 days.

(21) Appl. No.: 16/228,615

(22) Filed: Dec. 20, 2018

(65) Prior Publication Data
US 2019/0237074 A1 Aug. 1, 2019

(30) Foreign Application Priority Data
Jan. 26, 2018 (CN) .......................... 201810078330.0

(51) Int. Cl.
*G10L 15/22* (2006.01)
*G10L 15/30* (2013.01)
(Continued)

(52) U.S. Cl.
CPC .............. *G10L 15/22* (2013.01); *G06F 3/165* (2013.01); *G10L 15/30* (2013.01);
(Continued)

(58) Field of Classification Search
CPC ............................... H04L 29/06; H04W 48/16
See application file for complete search history.

(56) References Cited

U.S. PATENT DOCUMENTS

2015/0185834 A1* 7/2015 Wingrove ............... G06F 3/013
345/156
2018/0007060 A1* 1/2018 Leblang .............. H04L 63/0853
(Continued)

FOREIGN PATENT DOCUMENTS

| JP | 2014057235 A | 3/2014 |
| JP | 2014072665 A | 4/2014 |

(Continued)

OTHER PUBLICATIONS

Japanese Patent Application No. 2018-212652, Office Action dated Jan. 14, 2020, 5 pages.
(Continued)

*Primary Examiner* — Shreyans A Patel
(74) *Attorney, Agent, or Firm* — Lathrop GPM LLP

(57) ABSTRACT

Embodiments of the present disclosure are directed to a speech processing method, device, and a computer readable storage medium. The electronic device includes a microphone configured to receive voice information. A first communication module is operable to be connected to a server and configured to send the voice information to the server and to receive a control instruction generated based on the voice information from the server. A second communication module is operable to be connected to the terminal device and configured to send the control instruction to the terminal device and to receive an audio response to the control instruction from the terminal device. A speaker is configured to play the audio response.

18 Claims, 2 Drawing Sheets

(51) Int. Cl.
  *G06F 3/16*    (2006.01)
  *H04R 3/00*    (2006.01)
  *H04R 1/40*    (2006.01)
  *H04M 1/72412*  (2021.01)
  *H04M 1/72442*  (2021.01)

(52) U.S. Cl.
  CPC ........ *H04M 1/72412* (2021.01); *H04R 1/406* (2013.01); *H04R 3/005* (2013.01); *G10L 2015/223* (2013.01); *H04M 1/72442* (2021.01)

(56)                References Cited

U.S. PATENT DOCUMENTS

2018/0158460 A1*  6/2018  Lee ................... H05B 47/12
2018/0199123 A1*  7/2018  Rao ................... H04R 1/04
2018/0213072 A1*  7/2018  Shi ................... H04M 1/03

FOREIGN PATENT DOCUMENTS

JP        2015510309 A     4/2015
JP        2016218200 A    12/2016
JP        2017041759 A     2/2017

OTHER PUBLICATIONS

Japanese Patent Application No. 2018-212652, English translation of Office Action dated Jan. 14, 2020, 5 pages.

* cited by examiner

SPEECH PROCESSING METHOD, DEVICE AND COMPUTER READABLE STORAGE MEDIUM

CROSS-REFERENCE TO RELATED APPLICATION

The present application is based upon and claims priority to Chinese Patent Application No. 201810078330.0, filed on Jan. 26, 2018, the entirety contents of which are incorporated herein by reference.

FIELD

Embodiments of the present disclosure generally relate to an electronic device, and more particularly to a speech processing method and device, and a computer readable storage medium.

BACKGROUND

There are many Bluetooth speakers on the market that can play audio resources in a mobile device such as a mobile phone and an audio playback device. However, these Bluetooth speakers do not support voice interaction with the user. In addition, there are also some smart speaker products that can interact with the user and act as independent control centers. However, these smart speaker products do not support a good connection and interaction with the user's commonly used mobile phones, reducing the use frequency of these smart speaker products.

Thus, an electronic device that facilitates interoperability of terminal devices is needed.

SUMMARY

Embodiments of the present disclosure provide an electronic device configured to be interoperated with a terminal device and a related method.

Embodiments of the present disclosure provide an electronic device. The electronic device may include: at least one microphone, operable to receive voice information; a first communication module, operable to be connected to a server and configured to send the voice information to the server and to receive a control instruction generated based on the voice information from the server; a second communication module, operable to be connected to a terminal device and configured to send the control instruction to the terminal device and to receive an audio response to the control instruction from the terminal device; and a speaker, operable to play the audio response.

Embodiments of the present disclosure provide a speech processing method implemented at an electronic device. The method may include: sending voice information to a server in response to receiving the voice information from a user; receiving, from the server, a control instruction generated based on the voice information; sending the control instruction to a terminal device; receiving an audio response to the control instruction from the terminal device; and outputting the audio response.

Embodiments of the present disclosure provide a computer readable storage medium having a computer program stored thereon, the computer program being executed by a processor to implement the method according to the second aspect.

According to embodiments of the present disclosure, the summary is provided to introduce a selection of concepts in a simplified manner, the concepts will be described in the following detail description. The summary is not intended to identify key features or main features of the present disclosure, and not intended to limit the scope of the present disclosure.

BRIEF DESCRIPTION OF THE DRAWINGS

The above and other objects, features and advantages of the present disclosure will become more apparent by detail description of exemplary embodiments of the present disclosure with reference to the accompanying drawings, in which the same or similar reference numerals generally indicate the same or similar elements in the exemplary embodiments of the present disclosure.

DETAILED DESCRIPTION

Figure 1:
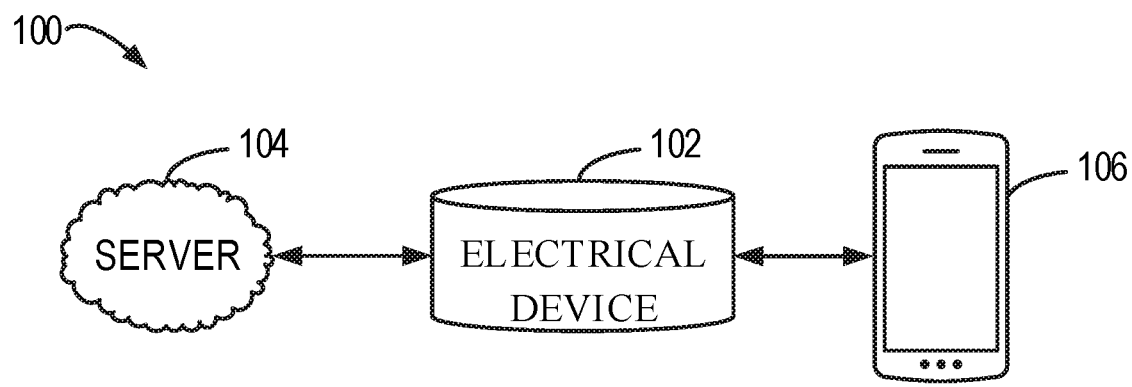
FIG. 1 illustrates a schematic diagram of an example environment for implementing various embodiments in accordance with the present disclosure.

Preferred embodiments of the present disclosure will be described in more detail below with reference to the accompanying drawings. Although the preferred embodiments of the present disclosure have been illustrated in the drawings, it should be understood that the present disclosure can be implemented in various manner without being limited by the embodiments described herein. Instead, the embodiments are provided to make the present disclosure more thorough and complete, and to fully describe the scope of the present disclosure to those skilled in the art.

In the description of the present disclosure, the terms "comprise" and its equivalents are to be understood as an open "include" (a non-exclusive "include"), i.e., "include but is not limited to". Unless specifically stated otherwise, the term "or" means "and/or". The term "based on" should be understood as "based at least in part (at least partially based on)". The term "one exemplary embodiment" or "an embodiment" should be taken to mean "at least one exemplary embodiment". The terms "first", "second" and the like may refer to different or identical objects. Other explicit and implicit definitions may also be included in the following.

FIG. 1 illustrates a schematic diagram of an example environment 100 for implementing various embodiments in accordance with the present disclosure. As shown in FIG. 1, an electronic device 102 may be coupled to a server 104, so as to receive data from the server 104 and/or to send data to the server 104. For example, the electronic device 102 may be connected to the server 104 via a wireless connection such as Wi-Fi or a cellular network. Alternatively, the electronic device 102 may also be connected to the server 104 via a wired connection to communicate with the server 104.

As shown in FIG. 1, the electronic device 102 is connected to a terminal device 106. The terminal device 106 may be a variety of mobile terminals or portable devices, such as mobile phones, tablets, portable multimedia devices, and the like. For example, the electronic device 102 may connect with the terminal device 106 via Bluetooth, low-power Bluetooth and the like, so as to receive data from the terminal device 106 and/or to send data to the terminal device 106. For example, the electronic device 102 may be a speaker, such as a smart speaker, and the electronic device 102 may also be a pedestal (or a cradle) configured to carry the terminal device 106. In an embodiment, the electronic device 102 is a pedestal configured to wirelessly charge the terminal device 106, which may perform at least some functions of the smart speaker. However, it should be understood that the pedestal, the smart speaker and the like are provided as merely examples, and the electronic device 102 may also be presented in other suitable configurations.

Figure 2:
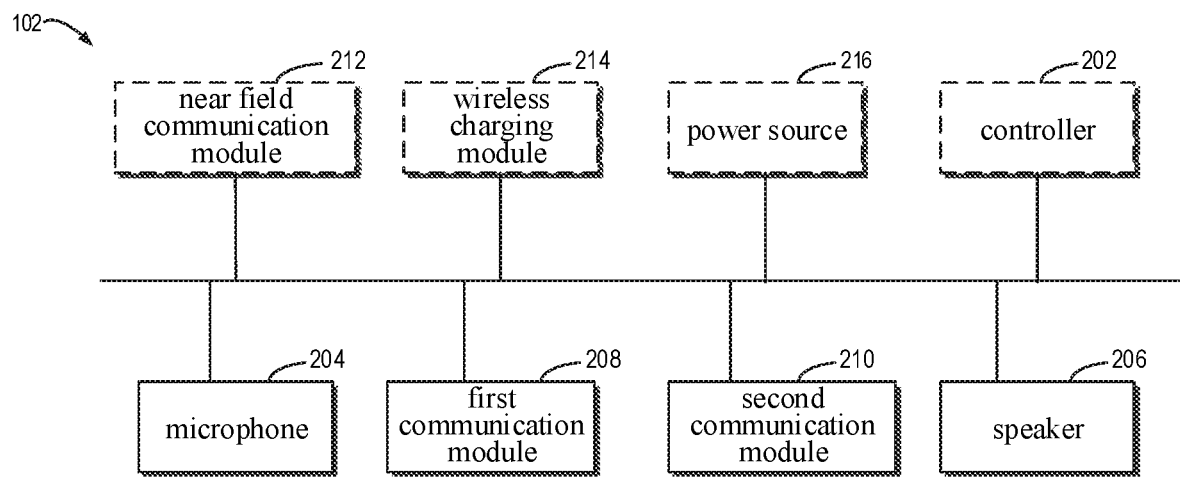
FIG. 2 illustrates a schematic block diagram of an electronic device in accordance with some embodiments of the present disclosure.

FIG. 2 illustrates a schematic block diagram of an electronic device 102 in accordance with some embodiments of the present disclosure. It should be understood that the various modules of FIG. 2 are merely exemplary, without limiting the scope of the present disclosure, and those skilled in the art may add, delete, or modify the modules in FIG. 2.

As shown in FIG. 2, the electronic device 102 may include a microphone 204, which may also be a microphone array formed by a plurality of microphones. The microphone array may enable a far-field pickup function. For example, the user may be far away from the microphone and there is a lot of noises, multipath reflections, and reverberations in the real environment. In this case, the microphone array may better pick up the voice information and improve the voice recognition rate.

As shown in FIG. 2, the electronic device 102 includes a first communication module 208, which may be connected to the server 104. For example, the first communication module 208 may be a Wi-Fi communication module or a cellular communication module. The electronic device 102 may be connected to the server 104 via a wireless connection such as Wi-Fi or a cellular network. Alternatively, the first communication module 208 may be a communication module that supports wired communication. The first communication module 208 may send the voice information received or collected by the microphone 204 to the server 104, and receive a control instruction generated based on the voice information from the server 104.

As shown in FIG. 2, the electronic device 102 may also include a second communication module 210 that may be connected to the terminal device 106 and that sends the control instruction received from the server 104 to the terminal device 106. The second communication module 210 may receive an audio response to the control instruction from the terminal device 106. The speaker 206 may play or output the audio response. In one specific example, the second communication module 210 is a Bluetooth communication module.

For example, the control instruction is an instruction for an operating system of the terminal device 106. Therefore, the user may directly retrieve various functions of the terminal device 106, for example, making a call, playing music, and the like. In this case, the user does not need to operate the terminal device 106 to open the corresponding application before making the interaction. For example, if the user wishes to play a certain piece of music, the user may open the music player via the control instruction to play the music without opening the music player in the terminal device 106. In this manner, the user may implement various functions of the terminal device 106 without holding the terminal device 106. For example, if the electronic device 102 may be a pedestal for charging the terminal device 106, the user may also operate the terminal device 106 by the electronic device 102 when the user places the terminal device 106 at the electronic device 102 to charge the terminal device 106.

In some embodiments, the electronic device 102 may be a device with a display, thereby having a relatively low manufacturing cost. In addition, as described above, the electronic device 102 may be a pedestal for carrying the terminal device 106 so as to charge the terminal device 106 or the like.

In some embodiments, the electronic device 102 may also include a near field communication module 212. The near field communication module 212 is configured to store configuration information for the second communication module 210. If it is determined that the terminal device is within a predetermined distance range of the electronic device, the near field communication module 212 sends the configuration information to the terminal device 106 such that the electronic device 102 is paired with the terminal device 106. For example, in the case where the second communication module 210 is a Bluetooth communication module, the electronic device 102 and the terminal device 106 are paired via Bluetooth.

In some embodiments, electronic device 102 may also include a controller 202. The controller 202 may be a processor (e.g., a general purpose processor) or control circuit system. The control circuit system may be an application specific integrated circuit (ASIC) or a programmable circuit such as a field programmable gate array (FPGA). For example, the controller 202 may control the one or more of the microphone 204, the speaker 206, the first communication module 208, the second communication module 210, the near field communication module 212, and the wireless charging module 214 to be turned on or off. In some embodiments, if the electronic device 102 is successfully paired with the terminal device 106, the controller 202 may turn on the microphone 204, the speaker 206, and the first communication module 208. In this case, the user may input the voice information to the electronic device 102 via the microphone 204, and the first communication module 208 may be connected to the server 104.

In some embodiments, the electronic device 102 also includes a wireless charging module 214. The wireless charging module 214 is configured to charge the terminal device 106. The wireless charging module 214 may detect the power of the terminal device 106, and when the detected power reaches a threshold, the charging function is stopped, and when the detected power is less than the threshold, the charging function is turned on. Additionally or alternatively, the electronic device 102 may also be a wired charging module (not shown) for charging the terminal device 106. A power source 216 may be connected to the wireless charging module 214 to provide power to the wireless charging module 214.

According to embodiments of the present disclosure, a user may conveniently and quickly access and take over a control system of the mobile terminal by interacting with an electronic device such as a smart speaker. For example, in the case where the smart speaker has a near field communication function and a wireless charging function, the user may conveniently and quickly connect the mobile terminal to the speaker via Bluetooth while charging the mobile terminal. The speaker takes over the control of the mobile terminal via Bluetooth, and realizes the remote voice control of the mobile terminal via the microphone array of the speaker and the power amplifier microphone, thereby realizing the convenient and quick combination of the intelligent interactive speaker and the mobile terminal.

Figure 3:
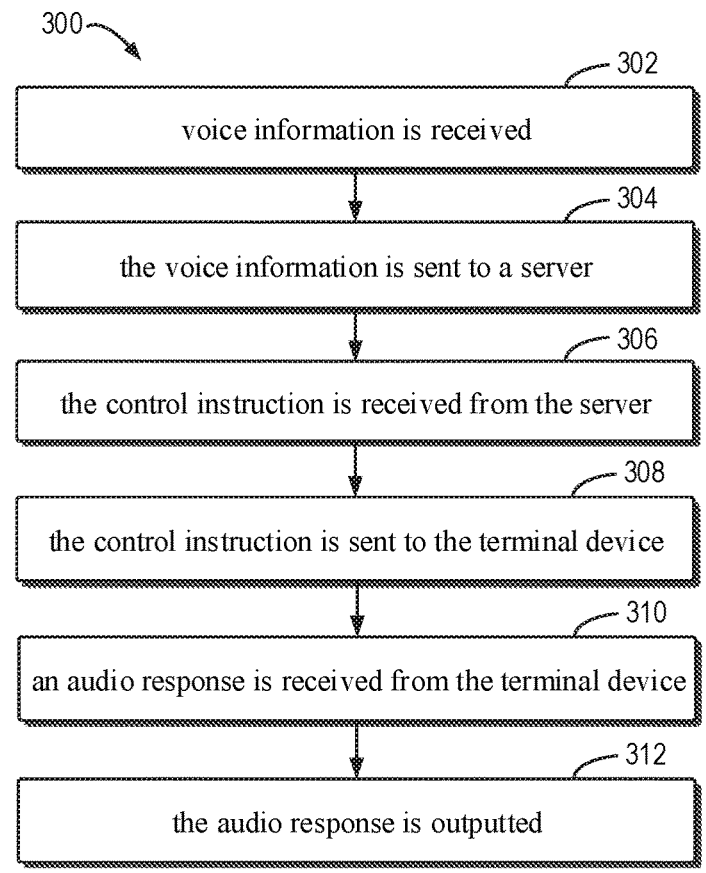
FIG. 3 illustrates a flowchart of a method of interacting with a terminal device in accordance with some embodiments of the present disclosure.

FIG. 3 illustrates a flowchart of a method 300 of interacting with a terminal device in accordance with some embodiments of the present disclosure. The method 300 may be implemented at electronic device 102 shown in FIG. 1 or 2. The electronic device 102 may be a device without a display. At block 302, the electronic device 102 receives voice information. For example, the electronic device 102 may receive the voice information via a microphone 204 (e.g., a microphone array). For example, the voice information may be "call Alice".

At block 304, the electronic device 102 sends the voice information to a server 104. In one embodiment, the electronic device 102 sends the voice information to the server 104 via Wi-Fi or a cellular network. For example, the electronic device 102 may send the voice information to the server 104 via the first communication module 208. The server 104 may identify the voice information and generate a control instruction for the terminal device 106 associated with the voice information and send it back to the electronic device 102.

At block 306, the electronic device 102 receives the control instruction from the server 104. In one embodiment, the electronic device 102 receives the control instruction from the server 104 via Wi-Fi or a cellular network. For example, the electronic device 102 may receive the control instruction from the server 104 via the first communication module 208. For example, the control instruction may be a control instruction for the operating system of the terminal device 106.

At block 308, the electronic device 102 sends the control instruction to the terminal device 106. For example, the electronic device 102 may send the control instruction to the terminal device 106 via the second communication module 210. As described above, the second communication module 210 may be a Bluetooth communication module. The control instruction will cause the terminal device 106 to be operated, for example, to open the dialing application and call Alice. In this case, the terminal device 106 may send an audio response to the electronic device 102. For example, in the example of making a call, the audio response may be a ringing music (or a polyphonic ringtone) of the incoming call.

At block 310, the electronic device 102 receives an audio response from the terminal device 106. For example, the electronic device may receive the audio response from the terminal device 106 via the second communication module 210.

At block 312, the electronic device 106 outputs the audio response. For example, the electronic device 106 may play or output the audio response via a microphone (e.g., a microphone array).

In some embodiments, the terminal device 106 may also be charged in a wireless manner. For example, the electronic device 102 may be a pedestal configured to carry the terminal device 106.

Figure 4:
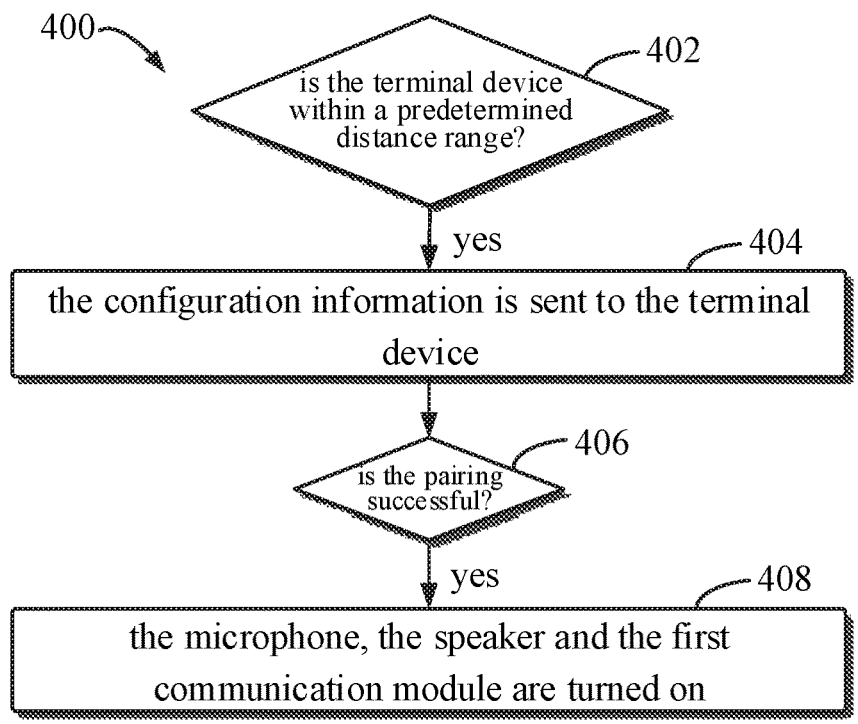
FIG. 4 illustrates a flowchart of a method of initiating an interaction with a terminal device in accordance with some embodiments of the present disclosure.

FIG. 4 illustrates a flowchart of a method 400 of initiating an interaction with a terminal device in accordance with some embodiments of the present disclosure. The method 400 may be implemented at an electronic device 102. At block 402, the electronic device 102 detects whether the terminal device is within a predetermined distance range. For example, the electronic device 102 may utilize the near field communication module 212 to detect whether the terminal device is within a predetermined distance range. If it is determined that the terminal device 104 is within the predetermined distance range of the electronic device 102, then at block 404, the electronic device 102 sends the configuration information of the second communication module 210 to the terminal device 104. After receiving the configuration information, the terminal device 104 may pair with the electronic device 102. At block 406, the electronic device 102 determines whether the pairing is successful. If the pairing is successful, the electronic device 102 turns on the microphone 204, the speaker 208, and the first communication module 208 at block 408. In this case, the user may interact with the terminal device 106 via the electronic device 102, for example, receiving voice information, sending the voice information to the server, and/or outputting an audio response.

Embodiments of the present disclosure are directed to methods, apparatuses, systems, and/or computer readable storage medium having computer readable program instructions for performing various aspects of the present disclosure stored thereon.

The flowchart and block diagrams in the figures illustrate the structure, functionality, and operation of possible implementations of systems, methods, and computer program products according to various embodiments of the present disclosure. In this regard, each block in the flowchart or block diagram may represent a module, a program segment, or a portion of the instructions, in which the module, the program segment, or a portion of the instructions may include one or more executable instructions. In some alternative implementations, the functions noted in the blocks may also occur in a different order than that illustrated in the drawings. For example, two consecutive blocks may be executed substantially in parallel, and they may sometimes be executed in the reverse order, depending upon the functionality involved. It is also noted that each block of the block diagrams and/or flowcharts, and combinations of blocks in the block diagrams and/or flowcharts, may be implemented in a dedicated hardware-based system that performs the specified functions or actions, or implemented by a combination of dedicated hardware and computer instructions.

The various embodiments of the present disclosure have been described above, and the foregoing description is illustrative, not including all alternatives, and not limited to the disclosed embodiments. Numerous modifications and changes will be apparent to those skilled in the art without departing from the scope of the invention. The choice of terms used herein is intended to best explain the principles of the various embodiments, the actual application, or improvements of the technology in the market, or to enable those of ordinary skill in the art to understand the embodiments disclosed herein.

What is claimed is:

1. A smart speaker with a near field communication function and a wireless charging function for charging a terminal device, comprising:

at least one microphone, operable to receive voice information;

a first communication module, operable to be connected to a server and configured to send the voice information to the server and to receive a control instruction generated based on the voice information from the server;

a second communication module, operable to be connected to the terminal device and take over a control system of the terminal device when the smart speaker charges the terminal device via Bluetooth, and configured to send the control instruction to the terminal device and to receive an audio response to the control instruction from the terminal device, wherein the control instruction is configured to launch an application in the terminal device to execute corresponding functions of the application, and the audio response comprises a piece of music when the application is a music player application and a ringtone when the application is a calling application; and a speaker, operable to play the audio response.

2. The smart speaker according to claim 1, wherein the smart speaker is a device without a display.

3. The smart speaker according to claim 1, the control instruction being an instruction for an operating system of the terminal device.

4. The smart speaker according to claim 1, further comprising:

a near field communication module, operable to store configuration information of the second communication module, and to send the configuration information to the terminal device in response to determining that the terminal device is within a predetermined distance range of the smart speaker, so as to cause the smart speaker being paired with the terminal device.

5. The smart speaker according to claim 4, further comprising a controller, the controller being configured to:

activate the at least one microphone, the speaker, and the first communication module in response to the smart speaker being successfully paired with the terminal device.

6. The smart speaker according to claim 1, further comprising:

a wireless charging module, operable to charge the terminal device.

7. The smart speaker according to claim 1, the second communication module being a Bluetooth communication module.

8. The smart speaker according to claim 1, the first communication module being at least one of a Wi-Fi communication module and a cellular communication module.

9. The smart speaker according to claim 1, the at least one microphone forming a microphone array.

10. A speech processing method implemented at a smart speaker with a near field communication function and a wireless charging function for charging a terminal device, comprising:

sending voice information to a server in response to receiving the voice information from a user;

receiving, from the server, a control instruction generated based on the voice information;

connecting to the terminal device and taking over a control system of the terminal device when the smart speaker charges the terminal device via Bluetooth;

sending the control instruction to the terminal device;

receiving an audio response to the control instruction from the terminal device, wherein the control instruction is configured to launch an application in the terminal device to execute corresponding functions of the application, and the audio response comprises a piece of music when the application is a music player application and a ringtone when the application is a calling application; and outputting the audio response.

11. The method according to claim 10, receiving the control instruction from the server comprising:

receiving, from the server, the control instruction for an operating system of the terminal device.

12. The method according to claim 10, further comprising:

causing the smart speaker being paired with the terminal device in response to determining that the terminal device is within a predetermined distance range of the smart speaker.

13. The method according to claim 12, further comprising:

in response to the smart speaker being successfully paired with the terminal device, performing at least one of:

receiving the voice information;

sending the voice information to the server; and outputting the audio response.

14. The method according to claim 10, further comprising:

charging the terminal device in a wireless manner.

15. The method according to claim 10, sending the control instruction to the terminal device comprising: sending the control instruction to the terminal device via Bluetooth; and receiving the audio response from the terminal device comprising: receiving the audio response from the terminal device via Bluetooth.

16. The method according to claim 10, sending the voice information to the server comprising:

sending the voice information to the server via at least one of Wi-Fi and a cellular network; and receiving the control instruction from the server comprising:

receiving the control instruction from the server via at least one of Wi-Fi and the cellular network.

17. The method according to claim 10, further comprising:

receiving the voice information from the user via a microphone array of the smart speaker.

18. A non-transitory computer-readable storage medium having a computer program stored thereon, the program being executed by a processor to implement a speech processing method implemented at a smart speaker with a near field communication function and a wireless charging function for charging a terminal device, the method comprising:

sending voice information to a server in response to receiving the voice information from a user;

receiving, from the server, a control instruction generated based on the voice information;

connecting to the terminal device and taking over a control system of the terminal device when the smart speaker charges the terminal device via Bluetooth;

sending the control instruction to the terminal device;

receiving an audio response to the control instruction from the terminal device, wherein the control instruction is configured to launch an application in the terminal device to execute corresponding functions of the application, and the audio response comprises a piece of music when the application is a music player application and a ringtone when the application is a calling application; and outputting the audio response.

* * * * *